United States Patent
Scheibel

[15] 3,652,155
[45] Mar. 28, 1972

[54] SLIDE PROJECTOR WITH CONTROLLED SLIDE CHANGER AND SEPARATE HOLDER

[72] Inventor: Josef Scheibel, Ober-Morlen, Germany
[73] Assignee: Braun AG, Frankfurt (Main), Germany
[22] Filed: July 30, 1969
[21] Appl. No.: 846,127

[30] Foreign Application Priority Data

July 30, 1968 Germany.....................P 17 72 984.9

[52] U.S. Cl................................353/25, 353/116, 353/118
[51] Int. Cl. ........................................................G03b 23/02
[58] Field of Search ..............353/25, 114, 116, 117; 355/40; 40/79, 36, 78.05; 318/674

[56] References Cited

UNITED STATES PATENTS

| | | | |
|---|---|---|---|
| 2,471,075 | 5/1949 | Oster | 318/674 |
| 3,140,433 | 7/1964 | Stoffels | 318/686 |
| 3,174,395 | 3/1965 | Krull | 353/118 |
| 3,225,652 | 12/1965 | Sauppe | 353/117 |
| 3,243,780 | 3/1966 | Bendick et al. | 40/78.05 |
| 3,296,727 | 1/1967 | Liguori | 353/25 |
| 3,372,502 | 3/1968 | Staar | 353/116 |
| 3,467,901 | 9/1969 | Deming | 318/674 |
| 3,510,215 | 5/1970 | Bennet | 353/25 |

Primary Examiner—Harry N. Haroian
Attorney—Michael S. Striker

[57] ABSTRACT

A system for projecting slides in which the slide to be projected is selected from an input such as depressed key switches. A slide holder subdivided into individual compartments each retaining a slide, is then moved into position so that the selected slide is accessible for projection. A followup switch coupled from the viewpoint of motion, to the slide holder, provides signals of the position of the holder and thereby the location of the individual slides with respect to the projector unit. Indicating circuitry is used to determine when the signals transmitted from the depressed key switches are equal to the signals provided by the followup switch, whereupon the slide holder becomes held in position. A slide changer then transfers the slide from the compartment selected, and into the projecting plane of the projector. The drive for the slide holder is reversible so that the holder takes the shortest path in reaching a selected slide.

15 Claims, 11 Drawing Figures

SLIDE PROJECTOR WITH CONTROLLED SLIDE CHANGER AND SEPARATE HOLDER

BACKGROUND OF THE INVENTION

The present invention resides in a slide projector with a separate slide holder driven through a slide-changing mechanism, and an arrangement for the free selection of the slide to be projected. The selected compartment of the slide holder is brought into the picture-changing plane after returning the slide-changing mechanism to the position in which the slide holder is released. Afterward, the slide-changing mechanism places the slide from the desired compartment into the projecting position.

It is known in the art to provide a slide projector with an independent positioning arrangement for the slide holder, for purposes of selecting freely the slide to be projected. In such conventional arrangements, the positioning arrangement is subdivided in correspondence to the compartmentalization of the slide holder, so that each desired slide within the individual compartment of the slide holder is within the operating region of the slide-changing mechanism. The conventional projector in such arrangement, possesses exceptionally extensive mechanical operating groups which are operated through handwheels. The construction of such conventional projector is, therefore, relatively complex and excludes the possibility of providing automatic control for carrying out a complete change of slides through performing the required projector functions.

Further known in the art, are slide projectors with two slide-holding guides. One of these slide-holding guides has a contact member which becomes actuated through control cams at the position of the slide. The arrangement is such that the motion of the slide holder and the slide changing become influenced or affected through coincidence of the contact member and the corresponding control cam combination.

The preceding projector requires mechanical handling for each individual slide through corresponding contact combination, and this limits severely the possibility of external control in view of the considerable mechanical complexity. With such an arrangement, furthermore, it is not possible to insert the direction of motion of the slide holder. For this reason, the projector must be provided with limit switches which are situated before the slide or picture to be used, taken in the direction of motion of the slide holder, in the selection of a slide. After having executed a complete path of motion in the given direction, the slide holder reverses in its direction of motion in order to reach the pre-selected slide holder compartment.

For operating such a projector as described above, furthermore, mechanical switching means must be provided which switch the operating current circuit in conjunction to the switching of the control current circuit.

Accordingly, it is an object of the present invention to provide a slide projector with a separate slide holder drive operating in conjunction with a slide-changing mechanism, in which the selection of the slide to be projected is accomplished through movement of the slide holder over the shortest possible route, regardless of the particular slide that has been previously projected. All functions required for accomplishing the slide change are to be carried out through closure of a single control current circuit, so that different control units may be connected to the projector in an optimum manner.

All of these requirements for the slide projector are met, in accordance with the present invention, by providing a control current circuit which includes the electrical drive for the slide-changing mechanism, as well as the electrical drive for the slide holder compartment selection. In accordance with the present invention, this current control circuit has at least one relay or similar switching means which maintains the control current circuit closed, in cooperation with switches actuated by the mechanisms, from the begining of the selection process to executing and completing the assigned task. Further switching means are also provided for inserting the direction in which the slide holder is to be driven.

By equipping the projector with the feature in which it is possible to select either forward motion or reverse motion of the slide holder, it is possible to move the slide to be projected, through the shortest path, regardless of whether the slide to be projected is sequentially in front of or behind of the previous slide that had been projected. The transporting or movement of the slide holder through the shortest path, for the purpose of projecting the selected slide, may be accomplished in the simplest manner through determining of the direction of motion of the slide holder by the operator or user of the projector.

It is of particular advantage when, in the projector, a control unit is arranged through which the selected slide is placed into projecting position, without requiring further action by the operator of the equipment. Such a control unit includes a follow-up switch which is synchronized with the motion of the slide holder. The follow-up switch operates together with a selection switch group and a diode row or chain for the purpose of determining the required direction of motion of the slide holder, as well as the point at which motion is to be terminated.

It is within the frame of the present invention to provide and design the control unit, in conjunction with the projector, of essentially two rows of resistances and a null indicator. By way of one row of switches used to select the picture or slide, the indicator becomes connected to one row of series-connected resistances. A follow-up switch synchronized with the motion of the slide holder serves as the means through which the indicator becomes connected to the other row of series-connected resistances. When the position of the follow-up switch corresponds to the actuated switches for selecting the slide, the null indicator terminates the process.

To control the projector with further controlling and regulating means, a switch is provided which is actuated by the slide holder. This switch which is connected to the control unit, provides signals for each step in going from one slide-holding compartment to another such compartment.

The projector can be constructed as an independent unit which is separate from the control units, and is within separate enclosures or housings. When required, however, the projector can be within the same housing of the control units. The projector unit and the control units, accordingly, are in the form of separate parts of a system which are only interconnected electrically, and which may be placed at any desired location.

SUMMARY OF THE INVENTION

An arrangement by which automatic selection of slides from a slide-holding device in the form of a tray or carousel, is made possible. The slide holder is subdivided into a plurality of compartments with each compartment holding a particular slide. Depending upon the slide selected, the slide holder is positioned at a predetermined position relative to the slide changer which removes the desired slide from the slide holder and places it into the plane of the projector, so that the slide may be projected onto a screen. Selection may be accomplished through a set of keys which may be arranged on a keyboard type of structure, and which provides signals representative of the particular slide selected. A follow-up switch is mechanically coupled to the motion of the slide holder, and is arranged to provide signals for the individual compartments of the slide holder, so that the slides and compartments are distinguishable. When the signals transmitted by the follow-up switch are identical to the signals initiated as a result of the selection of the slide through the keyboard, for example, the slide holder is held stationary, and the slide changer inserts or transfers the selected slide into the projection plane. Control units are applied in which one control unit is digitized to register or advance by one digit when a predetermined group of slides have been passed through, whereas the other control unit will register the passage of each individual slide. Reversing circuitry for the drive of the slide holder, permits the latter to take the shortest path to attain the selected slide.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
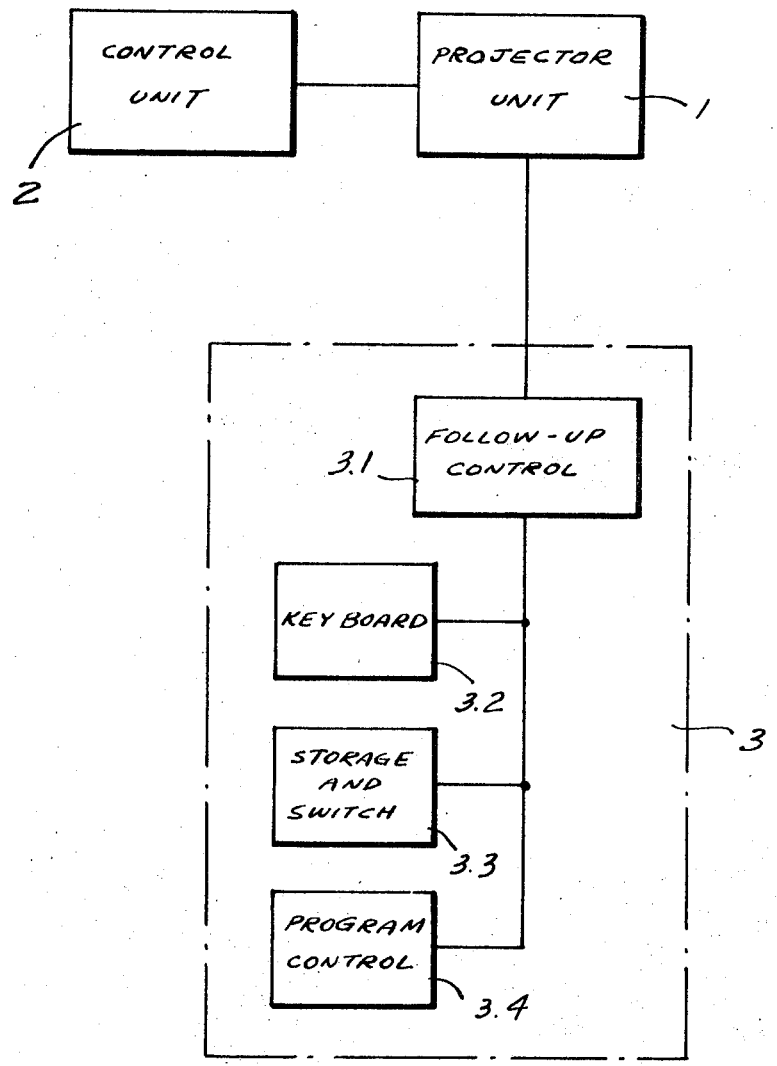
FIG. 1 is a block diagram of a projector unit with associated control units within a system enclosure and designed for selecting a slide to be projected, in accordance with the present invention.

Referring to the drawing and in particular to FIG. 1, the system, in accordance with the present invention consists essentially of a projector unit 1 and control units 2 and 3 which are selectively connected to the projector unit. The projector unit 1 is provided with two separate driving mechanisms 4 for the magazine transport and the slide-changing process. The projector unit remains unchanged, both electrically and mechanically, independent of the control unit employed therewith. As a result, considerable standardization and maximum interchangeability is attained.

The control unit includes all media for picture selection in the projector unit, through the use of a built-in counting contact in the projector unit. Thus, picture selection may be accomplished through, for example, manual operation with counting controls, counting circuits of all types, computer connections and computer terminals, and similar such arrangements.

The control unit 3 (remote control means) determines the selection of the slide through means of a follow-up control 3.1. The latter consists essentially of a circuit unit which is mechanically, electrically or the like followed up from the magazine motion. Furthermore, punch keys as, for examples, from a keyboard 3.2 are also connected to the follow-up control unit 3.1. A push-button switch with storage unit 3.3, and a program-control unit 3.4 also cooperate for the selection of a picture in a pre-programmed manner.

Figure 2:
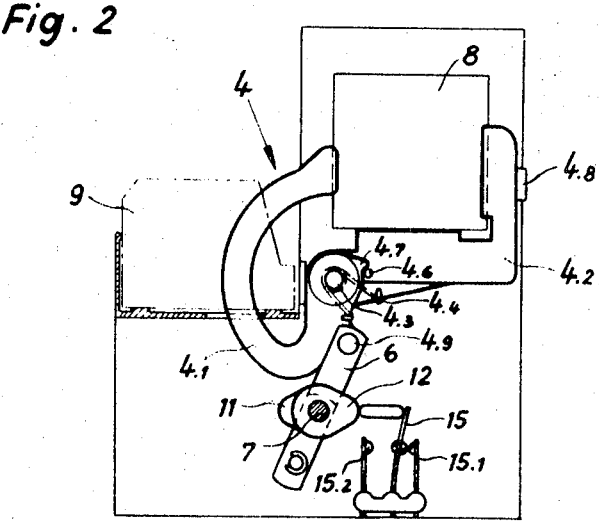
FIG. 2 is a plan view of the slide-changing mechanism of the projector unit with associated driving system, shown in the projecting position.
Figure 3:
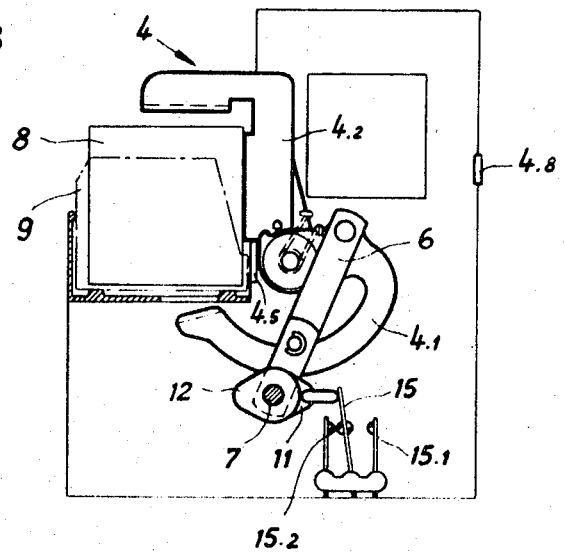
FIG. 3 is a plan view of the slide-changing mechanism of FIG. 2, when in the position in which the slide holder is released.
Figure 4:
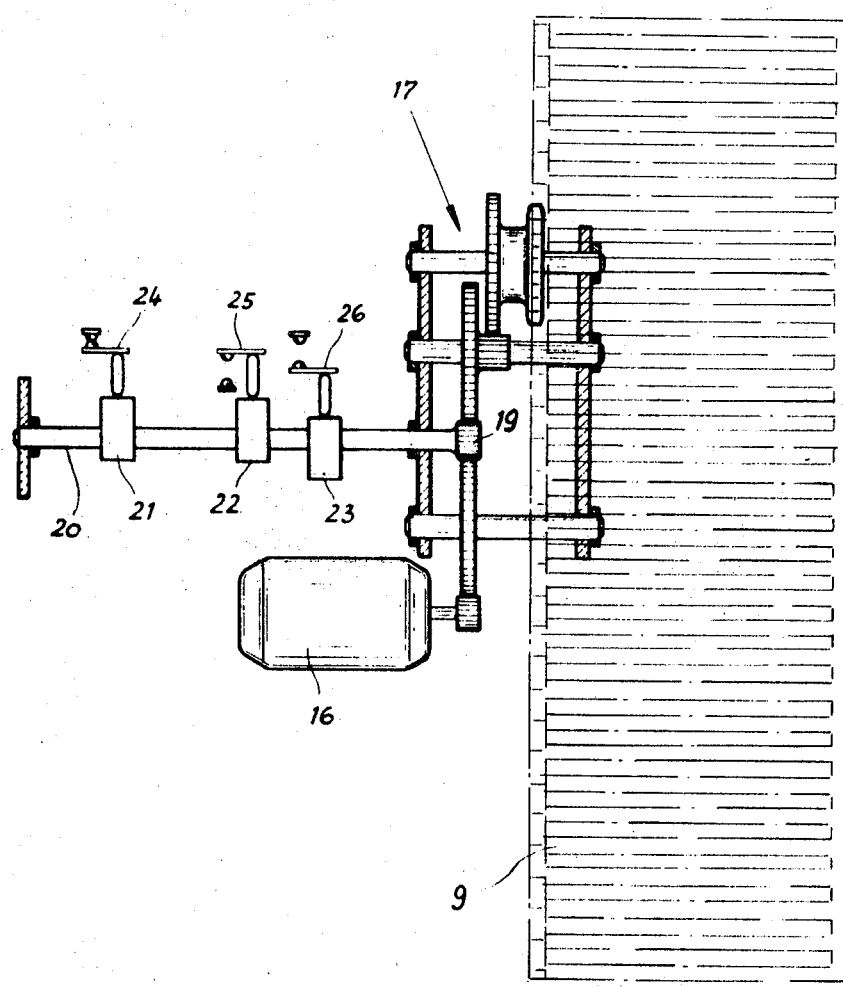
FIG. 4 is a plan view of the driving mechanism for the slide holder of the projector unit.

FIGS. 2 to 4 show the structural elements of the projector unit 1 for changing of slides and accomplishing the magazine or slide holder transport. The slide-changing mechanism is here in the form of a conventional picker 4 which has claws 4.1 and 4.2 rotatable about a fixed axis 4.3 under the action of a spring 4.4. The slide 8 is gripped by the picker or gripper 4 in the plane of the slide-changing area, and through rotation of approximately 90° about the projecting axis, the slide is transferred between the projection plane and the compartment in the slide holder or slide carousel, in which the slide is stored. The claws of the gripper 4 are spread, as shown in FIG. 3, so that they do not interfere with the longitudinal motion of the carousel or slide holder, when in the free or released position. Spreading of the gripper 4 or its claws, results from the abutment of its upper claw 4.2 against the block or abutment 4.5. The return motion of the claw results through a crank mechanism 6 for driving or operating the gripper claw 4.1 in the free or released holder position, in accordance with FIG. 3. Through the spring 4.4, the abutting members 4.6 and 4.7 become held in place together with the gripper claw 4.1 which is operatively coupled to the gripper claw 4.2, when the gripper 4 is in the projecting position. Such arresting feature of the spring 4.4 results through an abutting member 4.8 secured to the housing.

A crank drive or crank mechanism 6 is constructed from a crank 6.1 and a coupling rod 6.2 linked to a pin 4.9 of the gripper claw 4.1. This crank mechanism is for the gripper 4, and is driven or operated from a shaft 7. This shaft is, in turn, coupled to a driving motor 5 of the projection unit through a coupling drive which may, for example, be in the form of meshing gears. The gear ratio is made such that the shaft does not execute more than one revolution during a complete slide change. During the first half revolution of the driving shaft 7, the gripper 4 is moved out of its projecting position of FIG. 2, and into the position in accordance with FIG. 3 in which the slide holder is free or released. As a result, the slide 9 is free to be transported or moved. After the selective holder or tray compartment has been moved into the slide-changing plane, gripper 4, used to grasp the slide within this tray compartment, is closed, and is returned into its projecting position during the second half revolution of the driving shaft 7.

Figure 2A:
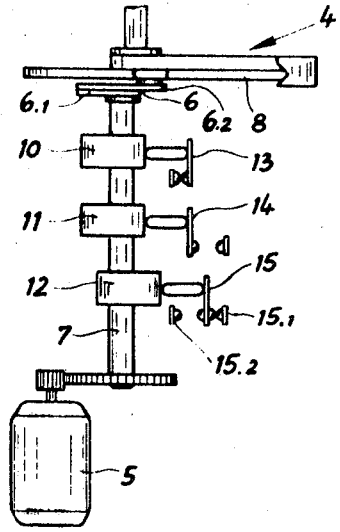
FIG. 2a is a side view of the arrangement of FIG. 2.
Figure 3A:
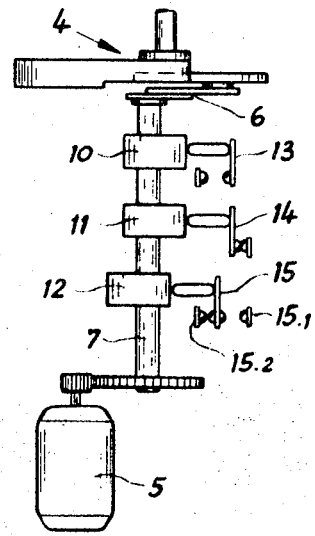
FIG. 3a is a side view of the arrangement of FIG. 3.

The drive shaft 7 is provided with cams 10, 11 and 12, as shown in FIG. 2a. These cams actuate switches 13, 14 and 15 so that the switch 13 is closed, the switch 14 is opened, and the contact 15.1 of the switch 15 is actuated, in the projecting position of the gripper 4. When the gripper 4 is in the position in which the tray or holder has been freely released in accordance with FIG. 3, then the switch 13 is open, the switch 14 is closed, and the contact 15.2 of the switch 15 is actuated, through the action of the cams 10, 11 and 12, in accordance with FIG. 3a.

The motor 16 of the projector unit 1 drives the slide tray or slide carousel 9 through a transmission arrangement 17, as shown in FIG. 4. A gear or pinion 19 mounted upon the shaft 20, is a part of the transmission unit 17. Cams 21, 22 and 23 are also mounted upon the shaft 20. In the position illustrated in the drawing, the gripper 4 is situated directly above a compartment of the slide tray or slide holder 9, so that a slide may be taken from that compartment. In this position of the slide holder, the switch 24 becomes closed through the cam 21, and the switch 25 is opened through the action of the cam 22. The cam 21 is designed so that the switch 24 becomes actuated over a larger rotational angle than the switch 25. The switch 26 becomes briefly closed by the cam 23 during 180° rotation of the shaft 20. During the remaining shaft rotation, this switch remains open.

Figure 5:
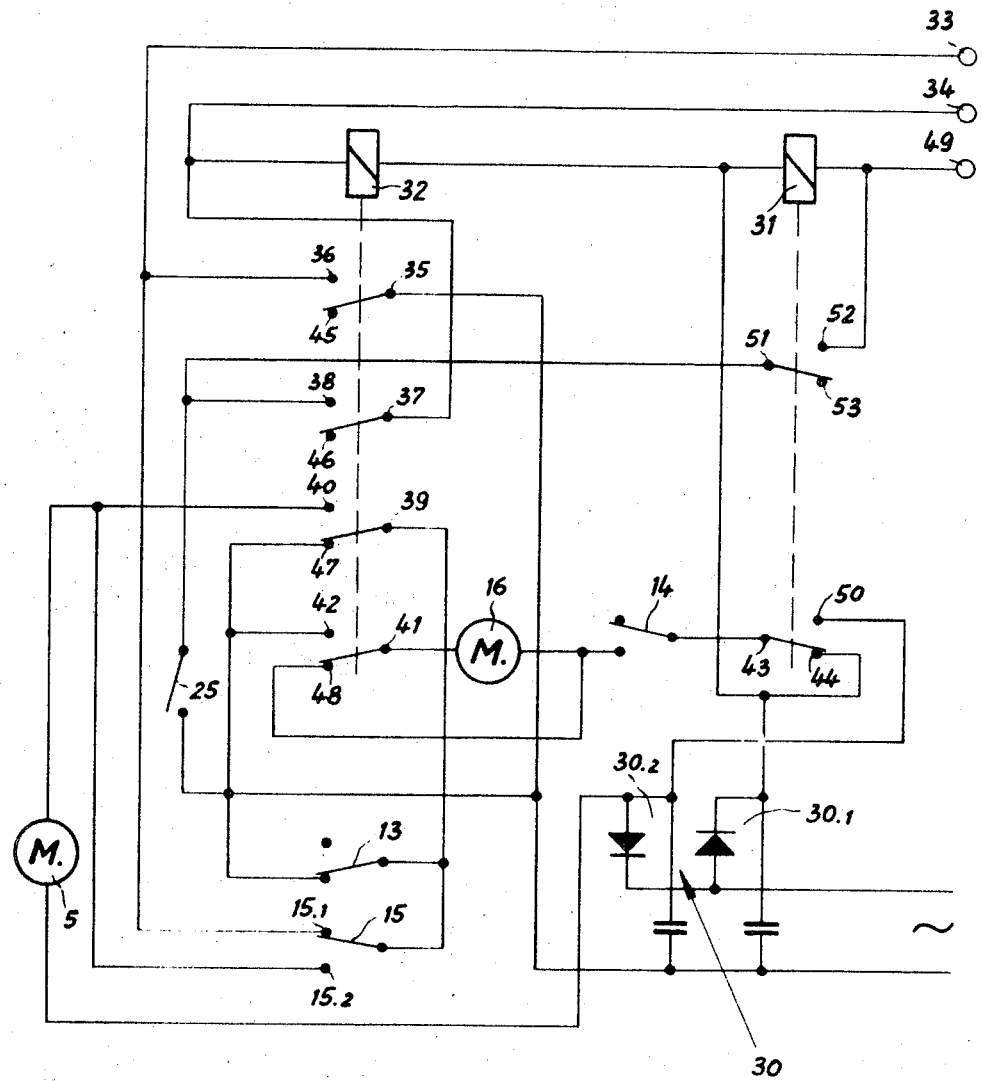
FIG. 5 is an electrical circuit diagram of the controlling arrangement of the projector unit.

In accordance with FIG. 5, a driving motor 5 for changing of the slide, and a motor 16 for moving the slide holder are provided in proximity of the projector unit 1. A DC voltage source 30 has two oppositely polarized voltage branches 30.1 and 30.2. The relay 31 connects selectively the motor 16 to the voltage branches 30.1 and 30.2, depending upon the desired rotation of the motor, as selected. The relay 32 cooperates with the switches 13, 14, 15 and 25 for carrying out the required switching sequence in the selection process. To initiate the process in which the slide holder is advanced in the forward direction, the connections 33 and 34 become connected to a manual actuated switch, not shown.

When the gripper 4 is in the projecting position, the switch 13 is closed, the switch 14 is open, and the contact 15.1 of the switch 15 is engaged. Through the switches 13 and 15, the relay 32 is connected to the DC current source 30 of the projecting unit. This DC power supply 30 is arranged so that the branch 30.1 is of positive polarity and the branch 30.2 is of negative polarity. The DC supply assumes the task of supplying the power requirements for the circuitry and, at the same time, provides the motor 16 with selected positive or negative terminals for varying the rotation of the motor as desired.

When the relay 32 is energized, circuit closures are established through contacts 35–36, 37–38, 39–40 and 41–42. The driving motor 5 for the gripper is, thereby, connected to the DC voltage source 30, by way of relay contacts 39–40 and the switch 13. The gripper 4 is thus moved into its position on the slide holder. The cam 12 and the driving shaft 7 of the gripper move the switch 15 against the contact 15.2. The relay 32, however, remains connected to the DC voltage source 30 through its contact 35–36, and thereby remains energized. When the gripper 4 has reached its position on the slide holder, the cam 10 mounted on the shaft 7 opens switch 13, while switch 14 becomes closed through cam 11. As a result, the circuit of the gripper motor 5 becomes interrupted or disconnected. Normally closed contacts 43–44 closed while relay 31 is unenergized for "forward" movement of the slide holder, connect the motor 16 for the slide holder 9 to the positive voltage terminal 30.1 of the DC source 30. As a result of this circuit closure through contacts 43 and 44, therefore, the motor 16 operates and moves the slide holder 9 in the forward direction.

Through the rotation of the shaft 20, the switch 25 becomes briefly opened after each completed step of the slide holder, as a result of the design of the cam 22. When the selected position of the slide holder is attained, the circuit connection between the terminals 33 and 34 is opened. The switch 25 retains the relay 32 energized through the contacts 37 and 38, until the initiated step of the slide holder has been completed. The switch 25 then opens, and the relay 32 becomes de-energized. In view of the de-energized state of the relay 32, the contacts 45, 46, 47 and 48 become engaged. The motor 16 becomes short-circuited through the relay contacts 41–48, and is thereby brought immediately into a stationary position. The gripper motor, on the other hand, becomes again connected to the DC supply source 30, through the relay contacts 39–47, and the contact 15.2 which is engaged by the switch 15. The gripper 4 becomes, consequently, moved from the position on the slide holder, and into the projecting position. Through the rotation of the driving shaft 7 of the gripper, the switch 13 becomes closed and the switch 14 becomes opened. When the gripper 4 has attained its projecting position, the switch 15 re-engages the contact 15.1. The current circuit for the gripper motor 5 becomes thereby interrupted or disconnected, so that the slide grasped by the gripper and located along the projecting axis of the projector can be projected.

If the slide holder 9 is to be transported or moved in the reverse or second direction, a circuit connection is established across terminals 33 and 49 through an auxiliary switch, not shown. This auxiliary switch is similar to that used for connecting to the terminals 33 and 44. With the terminals 33 and 49 connected, in this manner, the relay 31 is also energized next to the relay 32. The relay 31, when energized, establishes circuit closures through the contacts 51–52 and 43–50. In the de-energized state, the relay 31 establishes circuit closures through the contacts 51–53 and 43–44. When in the energized state, the relay is connected to the DC power supply 30 of the projector unit. If the driving motor 5 is disconnected from the power supply when the gripper 4 is in the position in which the slide holder is released or in free position, then the driving motor 16 of the holder 9 becomes connected to the negative voltage branch 30.2 of the DC power source 30, through the switching contacts 43–50 of the relay 31. As a result, the motor 16 is driven in the reverse direction. The normally open contacts 51–52 of the relay 31 correspond to in their operational manner to the normally open contacts 37–38 of the relay 32.

The switch 24 in FIG. 4 is connected between the terminals 33 and 49 so that the power circuit for the relay 31 is closed or connected only during the interval when the switch 24 is itself closed. In this manner, undesired reversal of the direction of rotation of the motor 16 while the slide holder is in motion is prevented.

Figure 6:
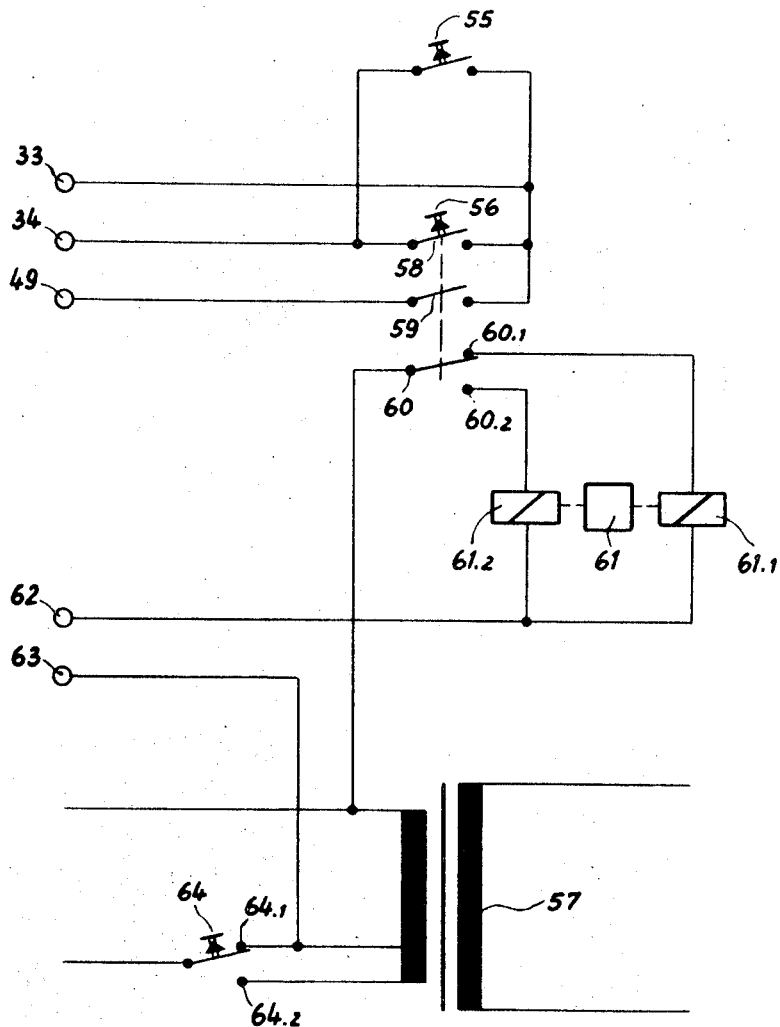
FIG. 6 is an electrical schematic diagram of a manual control unit which is a part of the system encompassed by the projector unit.

The control unit in accordance with FIG. 6, includes basically a push-button type of switch 55 for forward motion of the slide holder, a push-button type of switch 56 for the reverse or backwards motion of the slide holder, and a transformer 57 for providing the power of the system. When the push-button or momentary contact switch 55 is in closed circuit position, the terminals 33 and 34 of the projector unit are connected. The push-button or momentary type of contact switch 56 has three movable contacts 58, 59 and 60 which are actuated mechanically at the same time. When the switch 56 is thus actuated or depressed, the contact 58 connects the terminals 33 and 34, whereas the contact 59 connects the terminal 49 with the terminals 33 and 34.

The tray holder 9 is provided with indications or markings through which it is possible to observe the movement of the holder and, thereby, position the holder at the desired slide changing location through release of the switch 55 or the switch 56.

In order to facilitate remote control of the projector unit, the above mentioned indications or markings on the slide holder 9 are replaced by a counter 61 within the control unit, which is capable of addition and subtraction.

The switch 26 in FIG. 4 becomes briefly or momentarily closed for each individual step of the slide holder. If the switch 26 is connected to the terminals 62 and 63, and the momentary contact switch 56 is released, the adding circuit for the counter 61 becomes closed through the contact 60 and 60.1. Thus, as a result of the circuit closure through the contacts 60–60.1, the coil 61.1 is energized, and thereby the counter 61 is actuated into its adding functional mode. When, on the other hand, the momentary contact switch 56 is depressed, the contact 60 rests against the contact 60.2, so that the coil 61.2 is energized. With the coil 61.2 in the energized state, the counter 61 is actuated so that it performs a subtracting function.

A momentary contact switch 64 is built into the control unit additionally for rapid operation. In the undepressed state of the switch 64, the power supply is taken through the contact 64.1. When, however, the switch 64 is depressed, the power is provided with increased voltage through the contact 64.2, for the purpose of increasing the speed of the slide holder, when a longer distance has to be travelled by the holder, because of the particular slide selected.

Figure 7:
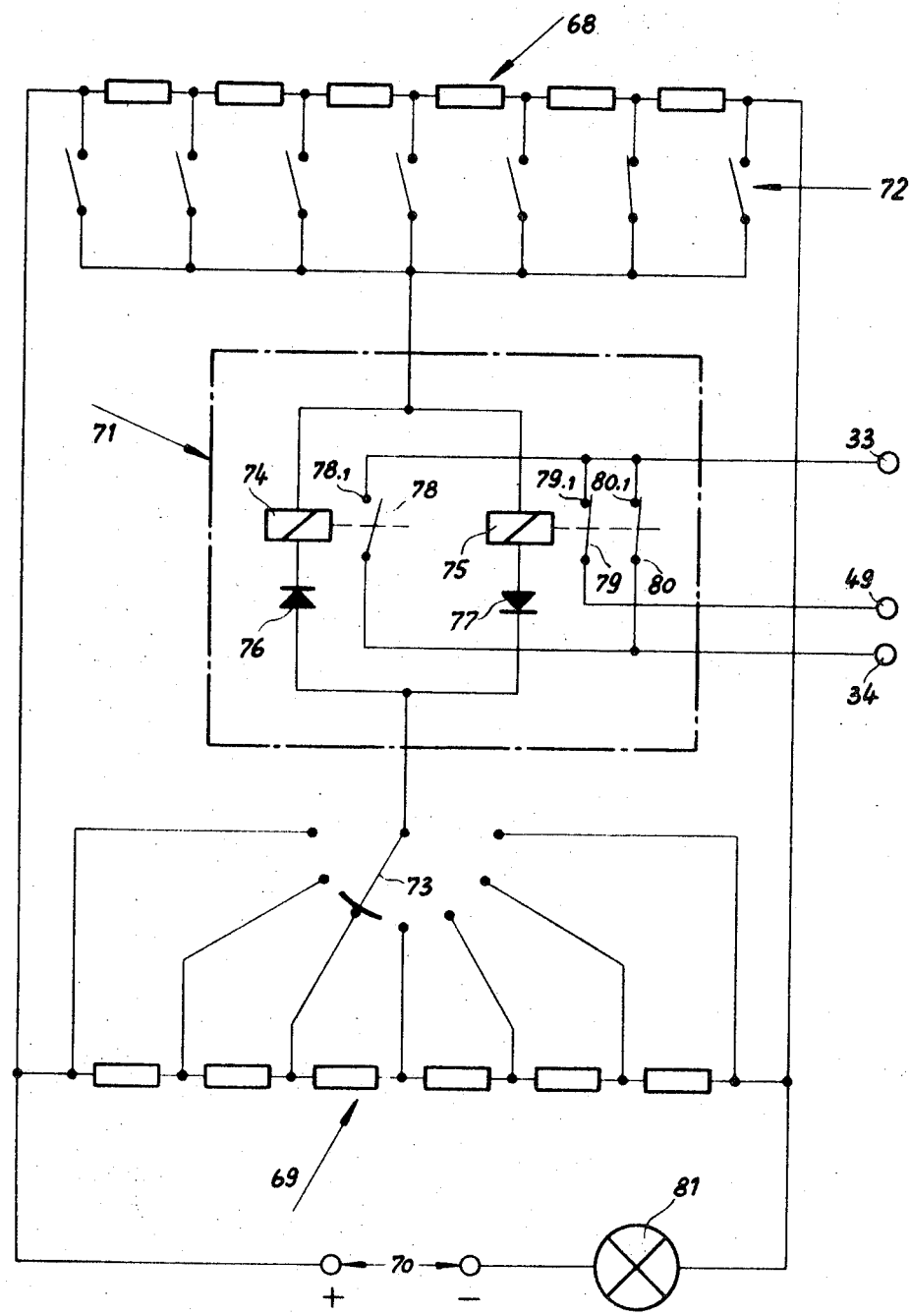
FIG. 7 is an electrical circuit diagram of a follow-up control unit which is a part of the system encompassed by the projector unit.

In the control circuit of FIG. 7, two rows of series-connected resistors 68 and 69 are provided. A DC power supply 70 is connected common to both these rows 68 and 69 of resistors. A null indicator 71 is connected to the row 68 of series-connected resistors, through a switching row 72 used for slide selection. At the same time, the null indicator 71 is also connected to the row 69 of resistors, by way of a follow-up switch 73 which is synchronized with the motion of the slide holder. A contact on the follow-up switch 73 is provided for each compartment of the slide holder 9, and a switching contact in the row of switches 72 is provided for each selectable slide number.

The null indicator 71 consists of two relays 74 and 75 connected in parallel and including rectifying diodes 76 and 77 in the coil circuits of the relays. The diodes or rectifiers 76 and 77 are connected so that they will transmit current in opposite directions in relation to each other. The relay 74 is provided with a switching contact 78 which, when closed, connects the terminals 33 and 34. The relay 75 has movable contacts 79 and 80. Through the circuit closure of the contact 79 and the contact 79.1, the terminals 33 and 49 are connected, whereas the circuit closure through contacts 80 and 80.1, connects the terminals 33 and 34. Accordingly, the functional operation of the switch 78 or the switches 79 and 80 correspond to the momentary contact switches 55 or 56 in FIG. 6.

Both rows of resistances 68 and 69 are to be scaled or selected in resistance magnitudes, so that current flow prevails through the null indicator 71 only when the switching position of the switch row 72 does not correspond to the follow-up switch 73. When the junction or tap of the row 68 of resistances is, for example, of higher positive potential derived from the switching row 72, than the potential taken from the follow-up switch 73 and resulting from the row 69 of resistances, then current flow will prevail through the relay coil 75 and the rectifying diode 77. When, on the other hand, the opposite case prevails so that the potential derived from the follow-up switch 73 is higher than that derived from the switching row 72, current flow prevails through the relay coil 74 and the diode 76 connected in series with that coil.

In place of the row 68 of resistances with the switching row 72, a potentiometer may be provided. At the same time, the row 69 of resistances together with the follow-up switch 73 may be replaced by a follow-up potentiometer with displacement synchronized with the motion of the slide holder. Thus, the follow-up potentiometer may be mechanically coupled to the transport mechanism of the slide holder. With circuitry of this type, the voltages taken from the indicator, and hence the currents, fluctuate over a wide range. For purposes of limiting the load capability, as well as the power capacity of the circuitry, a resistor 81 is connected in series with the DC power supply 70, in order to limit the current. It is of advantage when this resistance 81 is a component which increases its resistance value with increasing current flow through the resistor. By using an incandescent lamp for this resistor 81, such characteristics are achieved.

Figure 8:
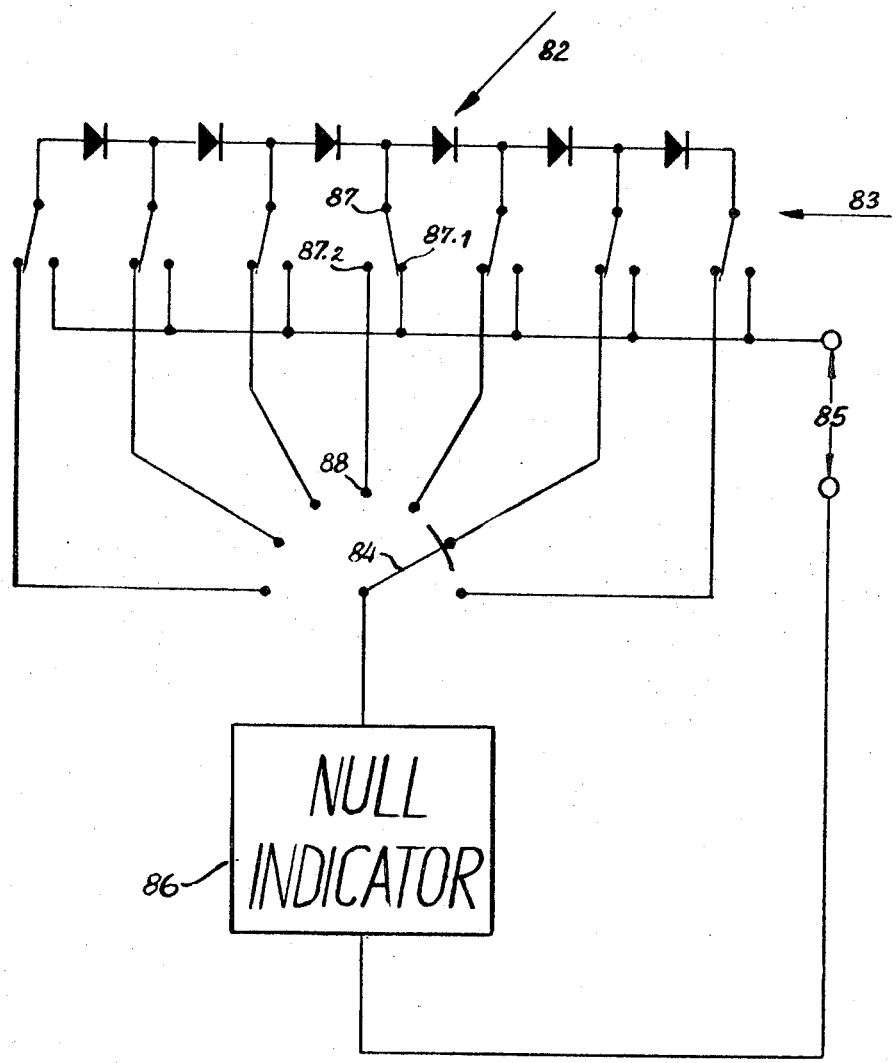
FIG. 8 is an electrical schematic diagram of another embodiment of the arrangement of FIG. 7.

In the follow-up control unit of FIG. 8, a plurality of rectifiers or diodes are connected in series to form a row of series-connected diodes. The end terminals of this row of diodes and the junctions of adjacent diodes are connected to a row of switches 83. When the switches 83 are in the state shown in FIG. 8, the movable contacts of the switches rest against contacts leading to a follow-up switch 84 which is displaced synchronously with the motion of the slide holder. Thus, the movable contact of the follow-up switch 84 may be mechanically coupled directly to the transport mechanism of the slide holder or slide tray or the slide carousel. The other contacts of the switch 83, on the other hand, are the operative contacts of these switches, and are connected to one terminal of an alternating voltage source 85. The movable contact of the switch 84 is connected to an indicator 86 which is identical in construction and operation to the null indicator 71 shown in FIG. 7. This null indicator 86 is also connected to the other pole of the AC voltage source 85.

If, now, the switch 87 in the row 83 of switches is, for example, actuated for purposes of selecting a slide, an AC voltage signal is applied to the row of diodes 82, by way of the switching contact 87.1. Depending upon the position of the follow-up switch 84, the null indicator 86 will then receive the negative half wave of the alternating voltage from the contacts of the switch 83 which have not been actuated, and which lie on the anode sides of the switch. At the same time, the null indicator 86 may receive the positive half wave of the alternating voltage from the switching contacts of the switches 83 lying on the cathode sides of the rectifier row 82, should the position of the follow-up switch 84 correspond to this effect. In the example illustrated in the drawing of FIG. 8, the movable contact of the follow-up switch 84 receives the positive half wave of the alternating voltage. As a result of this arrangement, the indicator 86 controls the projector unit 1 so that the slide holder is transported or moved in the reverse direction. Such reversed motion of the slide holder occurs until the movable contact of the follow-up switch 84, which is mechanically coupled to the motion of the slide holder, reaches the contact 88 of this follow-up switch. In this position of the follow-up switch 84, the current circuit to the indicator 86 becomes interrupted, because the switch 87 forms a circuit closure with the contact 87.1 so that the contact 87.2 is left free and is not connected in the circuit. With such current flow to the indicator 86 interrupted, the control of the projector unit 1 is terminated, and the selected slide is brought into the projecting position.

Figure 9:
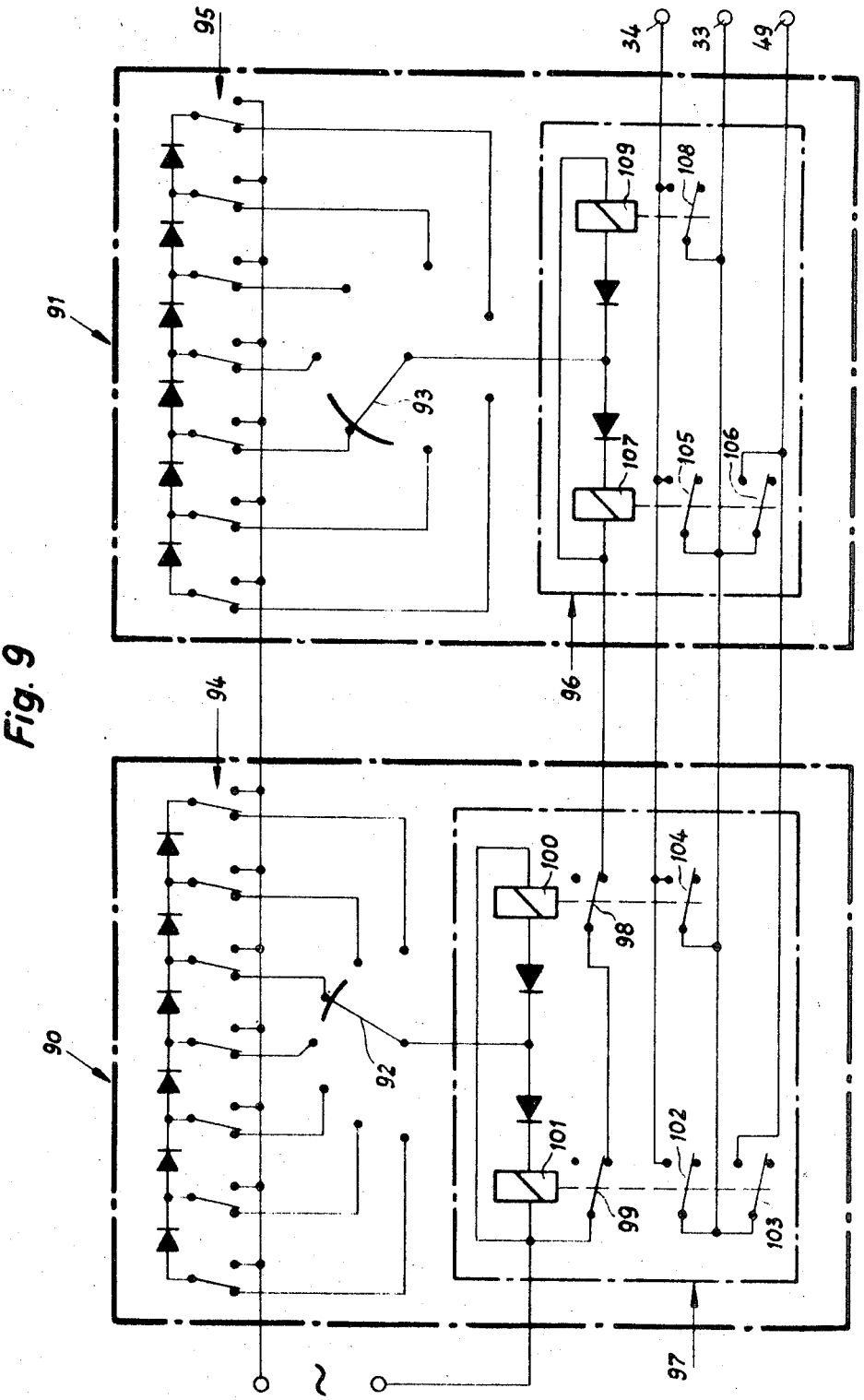
FIG. 9 is an electrical schematic diagram of a follow-up control unit for sensing the passage of groups of slides, as well as the passage of individual slides, as part of the system encompassed by the projector unit.

The arrangement of FIG. 9 shows, in principle, the circuitry of FIG. 8 in duplicate. As a result of such duplication, a larger number of slides is possible with relatively simple design and few components, as well as interconnections. The design of FIG. 9 is based on providing a control system which is subdivided into a follow-up control for slide groups 90, and a further follow-up control for each individual desired slide 91. The two follow-up switch arrangements 90 and 91 differ from each other whereby the follow-up switch 92 of the follow-up control 90 advances a single switching step synchronously with the motion of the slide holder when a picture group has been passed through. Such a picture group may, for example, consist of seven individual pictures. The follow-up switch 93, on the other hand, advances a switching step for every step of the slide holder. Thus, both switches 92 and 93 of the follow-up control units 90 and 91 are mechanically coupled to the drive mechanism of the slide holder, so that the motion of the movable contacts of the switches 92 and 93, is synchronous with the motion of the slide holder. The slide holder is, however, linked to the movable contact 92, so that the latter will advance by one step, first when a group of pictures or slides have been passed through, whereas the movable contact 93 is linked to the slide holder so that it will advance one step for each slide or individual picture which is passed through. Consequently, the units 90 and 91 may be considered to be coarse and fine control type of units. Assuming, for example, that gears are used to link the movable contacts 92 and 93 to the slide holder, then a gear ratio of 7:1 prevails between these two movable contacts of the follow-up switches 92 and 93, when a picture group consists of seven individual pictures or slides.

The selection of a slide to be projected is accomplished by actuating one switch of the switch row 94 in the follow-up control unit 90, and in addition actuating one switch in the switch row 95 of the control unit 91. The actuation of a switch in row 94 corresponds to the selection of a particular picture or slide group, whereas the actuation of one of the switches of the row 95 within the follow-up control unit 91, corresponds to the particular and individual slide desired. Accordingly, the control units 90 and 91 function in coarse and fine operation, as commonly known in practice. In order that operation be without interference until the desired picture group or slide group has been passed through, corresponding to the desired selection, the indicator 96 of the follow-up control unit 91 must be subordinate to the indicator 97 of the follow-up control unit 90. In the embodiment illustrated in the drawing, the current supply for the indicator 96 is provided through the switching contacts 98 and 99 of both indicator relays 100 and 101, respectively. The switching paths for controlling the projector unit 1 are established, as required, through the contacts 102 and 103 of the relay 101, the contact 104 of the relay 100, contacts 105 and 106 of the relay 107, as well as the contact 108 of the relay 109. Whereas relays 100 and 101 are situated within the follow-up control unit 90, and within the indicator 97 thereof, the relays 107 and 109 are within the indicator 96 of the follow-up control unit 91.

It is within the frame of the present invention to accomplish the picture or slide selection through a keyboard which is numbered in accordance with the slide numbering system, and which is provided with a switch for each key that is depressed or punched into the board. In this manner, a switch and key on the board are provided for each picture or slide group, and a further switch and key is provided for each desired individual slide.

The manner in which the additional and auxiliary circuits and different control units are applied and connected to the projector, allows several projector units and independently thereof, several control units to function together within the same enclosure of the system.

It will be understood that each of the elements described above, or two or more together, may also find a useful application in other types of controlled slide holders differing from the types described above.

While the invention has been illustrated and described as embodied in a controlled slide holder, it is not intended to be limited to the details shown, since various modifications and structural changes may be made without departing in any way from the spirit of the present invention.

I claim:

1. Slide projector arrangement, comprising, in combination, slide changing means; slide holder means having a plurality of slide holding compartments; first driving means operative upon energization to drive said slide holding means in a selected one of a first and second direction along a predetermined path including said slide changing location; second driving means operative when energized to drive said slide changing means between said slide changing location and said projecting location; voltage furnishing means; a plurality of first contact means operable by said first and second driving means at predetermined instants in the movement of said slide changing means and said slide holder means; switching element means having associated second contact means operable from a first to a second state upon energization of said switching element means; a first, second and third terminal; interconnecting means interconnecting said first and second driving means, said first and second contact means, said voltage furnishing means, said switching element means and said first, second and third circuit terminal in such a manner that additional connection between said first and second terminal initiates an operating cycle wherein said slide holder means move along said predetermined path in said first direction, and additional connection between said first, second and third terminals initiates an operating cycle wherein said slide holder means moves along said predetermined path in said second direction; and remote control means having electrical connection to said first, second and third terminal for selectively furnishing one of said additional connections to initiate a corresponding one of said operating cycles, and to remove said additional connection to terminate said operating cycle, said second contact means including holding contact means interconnected with said first contact means for maintaining energization of said switching element means following removal of said additional connection, until said slide holder means is correctly positioned relative to said slide changing location.

2. An arrangement as set forth in claim 1, wherein said additional connection is a short-circuit.

3. An arrangement as set forth in claim 2, wherein said switching element means comprise first and second relay means; wherein said additional connection between said first and second terminals energizes said first relay and said additional connection between said first, second and third terminals energizes said second relay means.

4. An arrangement as set forth in claim 3, wherein said first contact means comprise a first selected contact pair furnishing a counting signal upon each passage of one of said slide holder compartments through said slide changing location; and wherein said remote control means comprises first and second manually operated keying means for furnishing said additional connections respectively energizing said first and second relay means, and counting means for counting said counting signals and furnishing a visual indication thereof.

5. An arrangement as set forth in claim 4, wherein said counting means comprise means for counting forward in response to manual operation of said first keying means, and means for counting in reverse in response to manual operation of said second keying means.

6. An arrangement as set forth in claim 1, wherein said remote control means comprise first and second resistance means, said first resistance means having a plurality of taps corresponding to said plurality of slide compartments; null indicator means having a first and second input; a plurality of selector switches, each for selecting a slide in a corresponding slide compartment, each connecting one of said taps of said first resistance means to said first input of said null indicator means; wiper arm means connecting said second resistance means to said null indicator means; means driving said wiper arm in synchronism with said slide holder means; said null indicator means comprising means for short-circuiting said first and second or said first, second and third terminals in response to potential differences of first and second polarity respectively between said first and second input of said null indicator means.

7. An arrangement as set forth in claim 6, wherein said null indicator means comprise first and second null indicator relay means, each of said null indicator relay means having a coil and normally open contacts controlled by flow of current through said coil; first and second diode means connected in series with said first and second null indicator relay coils respectively; means connecting said first null indicator relay coil in series with said diode from said first to said second input of said null indicator means; means connecting said second null indicator relay coil in series with said second diode from said first to said second input in such a manner that current therethrough flows in opposite direction to current flowing through said first null indicator relay coil; and means connecting said normally open contact associated with said first null indicator relay means from said first to said second terminal and said normally open contacts associated with said second null indicator relay means from said first to said second and from said first to said third terminals.

8. An arrangement as set forth in claim 6, wherein said first and second resistance means each comprise a row of series-connected resistors.

9. An arrangement as set forth in claim 6, wherein said first and second resistance means each comprise a potentiometer.

10. An arrangement as set forth in claim 1, wherein said remote control means comprise a plurality of series connected diode means; a source of AC voltage; a plurality of selector switch means, each having a movable contact connected to the anode of one of said diode means, a normally open contact connected to said source of AC voltage and a normally closed contact; follow-up switching means having a plurality of contacts each connected to one of said normally closed contacts of said selector switching means and a movable wiper arm; null indicator means having a first input connected to said movable wiper arm and a second input connected to the source of AC voltage; and means driving said wiper contact of said follow-up switching means in synchronism with said slide holding means, said null indicator means furnishing one of said additional connections in response to a potential difference of predetermined polarity between said first and second inputs.

11. An arrangement as set forth in claim 1, wherein said slide holder compartments comprise a plurality of groups, each of said groups comprising a plurality of said slide holder compartments, whereby each of said slides has an associated group number and an associated compartment number; and wherein said remote control means comprise selector means for selecting said associated group number and said associated compartment number of a selected one of said slides, first control means furnishing said additional connection between said first and second or said first, second and third terminals until said one of said slide holder compartments having said desired group number is in said slide changing location, and second control means operative after said first control means for furnishing said additional connection until said slide holder compartment having said desired slide is in said slide changing location.

12. An arrangement as set forth in claim 1, further comprising means for increasing the speed of said first driving means.

13. An arrangement as set forth in claim 4, further comprising computing means connected to said remote control means.

14. An arrangement as set forth in claim 6, further comprising programming means connected to said remote control means for activating said selector switches.

15. An arrangement as set forth in claim 1, further comprising first housing means enclosing said remote control means, thereby constituting a remote control module; second housing means enclosing said arrangement excluding said remote control means, said so-enclosed arrangement constituting a projector module; further comprising additional projector modules; additional control modules; and means interconnecting said projector module, control module, additional projector modules, and additional control modules.

* * * * *